(12) United States Patent
Frank et al.

(10) Patent No.: US 9,069,084 B2
(45) Date of Patent: Jun. 30, 2015

(54) OPTICAL FIBER HAVING A COATING, A RADIATION SENSOR AND A RADIATION DETECTION APPARATUS INCLUDING THE OPTICAL FIBER AND A METHOD OF MAKING USING THE SAME

(75) Inventors: John M. Frank, Hartville, OH (US); Eric E. Mattmann, Paris (FR)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 463 days.

(21) Appl. No.: 13/474,178

(22) Filed: May 17, 2012

(65) Prior Publication Data

US 2012/0292519 A1    Nov. 22, 2012

Related U.S. Application Data (60) Provisional application No. 61/487,210, filed on May 17, 2011.

(51) Int. Cl.
| | | |
|---|---|---|
| *G01T 1/20* | (2006.01) | |
| *G01T 3/06* | (2006.01) | |
| *G01T 1/164* | (2006.01) | |

(52) U.S. Cl.
CPC ............. *G01T 1/201* (2013.01); *G01T 1/2018* (2013.01); *G01T 1/1644* (2013.01); *G01T 3/06* (2013.01)

(58) Field of Classification Search
CPC ...... G01T 1/201; G01T 1/2018; G01T 1/1644
USPC .......................................... 250/367
See application file for complete search history.

(56) References Cited

U.S. PATENT DOCUMENTS

| | | | | |
|---|---|---|---|---|
| 4,795,910 A | * | 1/1989 | Henderson et al. | 250/483.1 |
| 5,264,702 A | * | 11/1993 | Mihalczo | 250/390.11 |
| 5,636,299 A | * | 6/1997 | Bueno et al. | 385/15 |
| 5,680,423 A | | 10/1997 | Perkins et al. | |
| 6,384,400 B1 | * | 5/2002 | Albagli et al. | 250/214 VT |
| 6,989,541 B2 | | 1/2006 | Penn | |
| 7,214,943 B2 | | 5/2007 | Katagiri et al. | |
| 7,233,007 B2 | * | 6/2007 | Downing et al. | 250/390.11 |
| 7,244,947 B2 | | 7/2007 | Polichar et al. | |
| 7,333,701 B1 | * | 2/2008 | Feller et al. | 385/123 |
| 7,335,891 B2 | | 2/2008 | Kniss et al. | |

(Continued)

FOREIGN PATENT DOCUMENTS

WO          2009149391 A1      12/2009

OTHER PUBLICATIONS

The International Search Report and the Written Opinion for International Application No. PCT/US2012/038361 received from the International Searching Authority (ISA/KR), mailed Jan. 14, 2013, 10 pages.

(Continued)

*Primary Examiner* — Christine Sung
(74) *Attorney, Agent, or Firm* — Abel Law Group, LLP; Robert N. Young (57) ABSTRACT

A radiation detection apparatus can include a radiation sensor having a corresponding radiation sensing region, and a photosensor that is optically couple to the radiation sensor. The radiation sensing region can include optical fibers. In an embodiment, some or all of the optical fibers can be coated. The coating can include a phosphorescent material. In an embodiment, the optical fibers can be arranged in a manner such that optical substrates have substantially no bends.

13 Claims, 9 Drawing Sheets

(56) References Cited

U.S. PATENT DOCUMENTS

| | | | |
|---|---|---|---|
| 7,372,041 | B1 | 5/2008 | Nagarkar et al. |
| 7,741,612 | B2 | 6/2010 | Clothier et al. |
| 2004/0120649 | A1* | 6/2004 | Klosowiak et al. ............ 385/49 |
| 2005/0023479 | A1* | 2/2005 | Grodzins ................ 250/390.11 |
| 2008/0237485 | A1* | 10/2008 | Beinhocker ................ 250/474.1 |
| 2010/0084562 | A1 | 4/2010 | Angell et al. |
| 2010/0127177 | A1* | 5/2010 | Schmitt et al. ................ 250/362 |
| 2010/0230603 | A1 | 9/2010 | Clothier et al. |
| 2010/0276602 | A1* | 11/2010 | Clothier et al. ............... 250/362 |
| 2011/0089332 | A1* | 4/2011 | Ivan et al. ................ 250/390.11 |
| 2011/0309257 | A1* | 12/2011 | Menge .......................... 250/368 |

OTHER PUBLICATIONS

Ginhoven et al., "Radiation Portal Monitor Project, Alternative Neutron Detector Technologies for Homeland Security," Homeland Security, PIET-43741-TM-840, Revision 0, PNNL-18471, U.S. Department of Energy, Pacific Northwest National Laboratory, Richland, Washington 99352, dated Jun. 9, 2009, 36 pages.

Lintereur et al., "Coated Fiber Neutron Detector Test," U.S. Department of Energy, PNNL-18919, Pacific Northwest National Laboratory, Richland, Washington 99352, dated Oct. 22, 2009, 35 pages.

Kouzes et al., "Full Scale Coated Fiber Neutron Detector Measurements," U.S. Department of Energy, PNNL-19264, Pacific Northwest National Laboratory, Richland, Washington 99352, dated Mar. 17, 2010, 28 pages.

Kouzes et al., "3HE Alternatives for National Security," Pacific Northwest National Laboratory, AAAS Workshop, <http://cstsp.aaas.org/files/he3_kouzes.pdf>, dated Apr. 6, 2010, 8 pages.

"BC-704 and BC-705 for Neutron Radiography," BICRON, Saint-Gobain Crystals & Detectors, Saint-Gobain Ceramics & Plastics, Inc., dated 2002, 2 pages.

Hutchinson et al., "Position Sensitive Scintillation Neutron Detectors using a Crossed-Fiber Optic Readout Array," <http://www.osti.gov/bridge/servlets/purl/9130-WfARsT/native/9130.pdf>, printed Jul. 13, 2012, 4 pages.

Hutchinson et al., "Neutron Scintillators Using Wavelength Shifting Fibers," Journal of Neutron Research, IOS Press, ISSN 1023-8166 (Print) 1477-2655 (Online), vol. 4, No. 104, <http://iospress.metapress.com/content/g586372n82650813/>, Abstract Only, online date: Thursday, Jun. 10 2010, printed Sep. 3, 2010, 1 page.

Yagi et al., "A small high sensitivity neutron detector using a wavelength shifting fiber," PubMed, U.S. National Library of Medicine, National Institute of Health, Elsevier, Abstract Only, <http://www.ncbi.nlm.nih.gov/pubmed/20692842>, printed Sep. 3, 2010, 1 page.

* cited by examiner

OPTICAL FIBER HAVING A COATING, A RADIATION SENSOR AND A RADIATION DETECTION APPARATUS INCLUDING THE OPTICAL FIBER AND A METHOD OF MAKING USING THE SAME

CROSS-REFERENCE TO RELATED APPLICATION

This application claims priority under 35 U.S.C. §119(e) to U.S. patent application Ser. No. 61/487,210 entitled "Optical Fiber Having a Coating, a Radiation Sensor and a Radiation Detection Apparatus Including the Optical Fiber and a Method of Making Using the Same," by Frank et al., filed May 17, 2011, which is assigned to the current assignee hereof and incorporated herein by reference in its entirety.

FIELD OF THE DISCLOSURE

The present disclosure is directed to optical fibers, radiation sensors and radiation detection apparatuses and methods of using the same, and more particularly to optical fibers, radiation sensors and radiation detection apparatuses including the optical fibers, and methods of making and using the foregoing.

BACKGROUND

Figure 1:
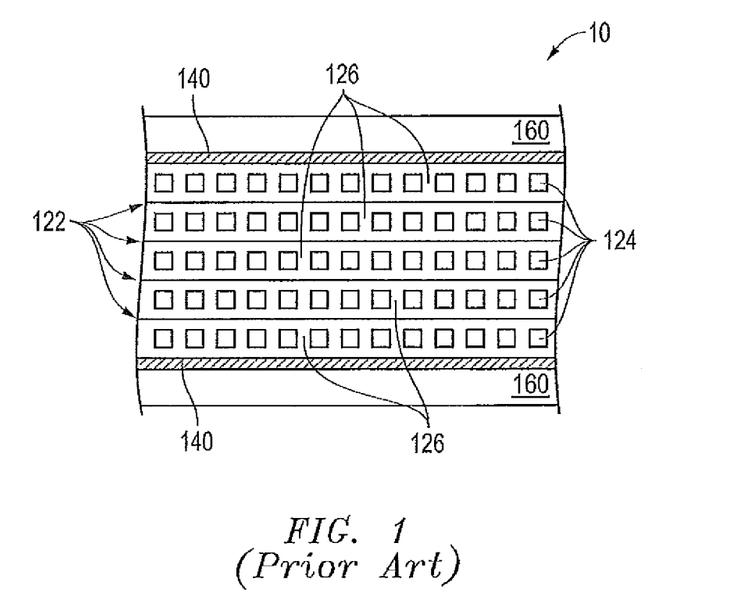
FIG. 1 includes an illustration of a cross-sectional view of a portion of a conventional radiation sensor. (Prior Art)

A radiation detector can include a plastic scintillator, such as BC-704™-brand scintillator available from Saint-Gobain Crystals of Hiram, Ohio, USA. The BC-704™-brand scintillator includes alternating layers of wavelength shifting fibers and phosphorescent materials. FIG. 1 includes a cross-sectional view of a conventional radiation sensor 10 that includes layers of phosphorescent material 122 that includes $^6$LiF and silver doped ZnS (ZnS:Ag). In another scintillator, copper doped ZnS (ZnS:Cu) may be used instead of ZnS:Ag. Scintillating light from the phosphorescent material 122 passes through a clear epoxy 126 and is received by rectangular-shaped wavelength shifting fibers 124. A reflector 140 surrounds the combination of the phosphorescent material 122, the wavelength shifting fibers 124, and the clear epoxy 126 as illustrated in FIG. 1 to increase the amount of scintillating light received by the wavelength shifting fibers 124. The scintillating light is shifted to light of a longer wavelength and transmitted to a photosensor (not illustrated) that converts light received by the photosensor to an electronic signal. Further illustrated in FIG. 1 is a neutron moderator 160 that converts fast neutrons to thermal neutrons to increase the likelihood of capture by the phosphorescent material 122. The radiation sensor 10 can be in the form of a rectangle, and another scintillator can be in the form of a disk.

BRIEF DESCRIPTION OF THE DRAWINGS

Embodiments are illustrated by way of example and are not limited in the accompanying figures.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the term "cross section" or a variant thereof, refers to a direction that is substantially perpendicular to lengths of the optical fibers within a radiation sensing region of a radiation sensor.

The terms "comprises," "comprising," "includes, " "including, " "has, " "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the scintillation and radiation detection arts.

Figure 2:
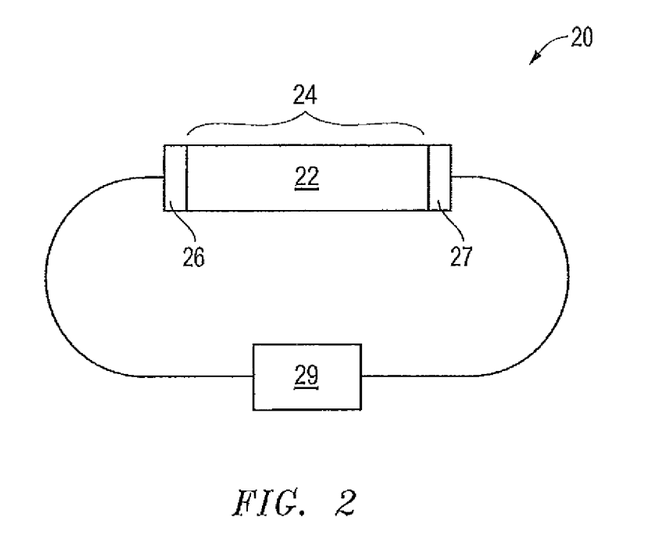
FIG. 2 includes an illustration of a radiation detection apparatus in accordance with an embodiment.

FIG. 2 includes an illustration of an embodiment of a radiation detection apparatus 20. In the embodiment illustrated, the radiation detection apparatus 20 includes a radiation sensor 22 and photosensors 26 and 27 that are optically coupled to the radiation sensor 22, which has a corresponding radiation sensing region 24. In a particular embodiment, the radiation sensor 22 has a main body that is substantially cylindrical. Thus, the radiation sensor 22 may appear like a tube. In other embodiments, the radiation sensor 22 can have many other shapes, some of which are described later in this specification. The radiation sensing region 24 can extend substantially to the ends of the radiation sensor 22 or a smaller portion thereof. For example, in another embodiment described later in this specification, the optical fibers may bend before reaching locations wherein the optical fibers are optically coupled to photosensors. The bends lie outside a radiation sensing region of the radiation sensor.

Each or both of the photosensors 26 and 27 can be in the form of a photomultiplier tube (PMT), a semiconductor-based photomultiplier, or a hybrid photosensor. The photosensors 26 and 27 can receive light from the optical fibers 22 and generate electrical pulses based on the numbers of photons that they receive. The photosensors 26 and 27 are electrically coupled to an electronics module 29. The electrical pulses can be shaped, digitized, analyzed, or any combination thereof by the electronics module 29 to provide information regarding the amount of light received from either or both of the photosensors 26 and 27 or other information. The electronics module 29 can include an amplifier, a discriminator, an analog-to-digital signal converter, a photon counter, another electronic component, or any combination thereof. In an alternative embodiment (not illustrated), one of the photosensors 26 or 27 may be replaced by a reflector. Only one photosensor may be used with a reflector in place of the photosensor on the other side of the detector. Analysis may also incorporate one or more signal analysis algorithms in an application-specific integrated circuit ("ASIC"), a field-programmable gate array ("FPGA"), or another similar device.

Figure 3:
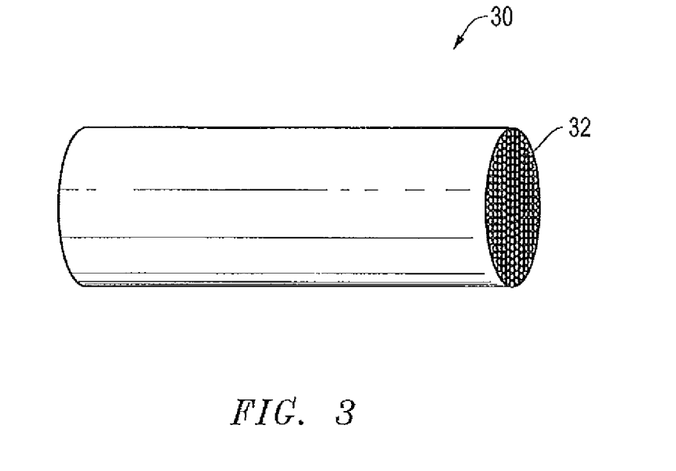
FIG. 3 includes an illustration of a perspective view of a portion of a radiation sensor in accordance with an embodiment.

FIG. 3 includes an illustration of an embodiment of a portion of a radiation sensor 30. The radiation sensor can include optical fibers 32. In an embodiment, the optical fibers 32 can be held together by a binder. In another embodiment, the optical fibers 32 can by held together mechanically. The optical fibers 32 may be arranged in an array of rows and columns (not illustrated in FIG. 3) or an irregular pattern (for example, not an array of rows and columns). The optical fibers 32 can be in the form of a closely packed bundle, wherein a majority of the optical fibers 32 contact at least three other fibers. The space between fibers 32 can be occupied at least part with a binder. In another embodiment, the space between fibers 32 can be air or another gas.

The optical fibers 32 can include optical substrates and some or all of the optical substrates may be coated. In an embodiment, the optical substrate can be an optical core by itself or a combination of an optical core surrounded by a cladding or other coating having a different refractive index as compared to the optical core, wherein such cladding or other coating can improve attenuation. The optical substrates can include a polymer. The polymer can include a polyacrylate, such as polymethylmethacrylate ("PMMA"); a polystyrene; a polyvinyltoluene; or another suitable light-transmitting polymer. In a particular embodiment, a layer including PMMA surrounding an optical core that includes polystyrene. The optical substrates may include a material, such as any of the foregoing polymers, that is capable of converting a fast neutron to a thermal neutron.

The optical substrates can also include a wavelength-shifting material, a scintillating material, or both together. In an embodiment, the optical substrates can shift the wavelength of scintillating light to a longer wavelength. For example, the optical substrates may shift the wavelength to blue light or green light.

For coated optical fibers, the coating can substantially surround the perimeter of an individual optical substrate. The coating can produce scintillating light in response to capturing targeted radiation. In an embodiment, the targeted radiation is neutrons, and in another embodiment, the targeted radiation is gamma radiation.

The coating includes a phosphorescent material. When the targeted radiation is neutrons, the phosphorescent material can include different materials. One of the materials can be capable of generating a secondary particle in response to capturing a targeted radiation. In an embodiment, the material can include $^6$Li or $^{10}$B. In a particular embodiment, the material can include $^6$LiF. Another material can be capable of generating scintillating light in response to exposure to the secondary particle. The other material can include a ZnS, a $CdWO_4$, a $Y_2SiO_5$, a ZnO, a ZnCdS, or any combination thereof. In a particular embodiment, the other material can include ZnS:Ag, ZnS:Cu, ZnS:Ti; $Y_2SiO_5$:Ce, ZnO:Ga, ZnCdS:Cu, or any combination thereof. The coating can further include a binder. The binder can be transparent or translucent to the scintillating light, wavelength shifted light, or both. In an example, the binder can be an organic material, such as an epoxy or an acrylate.

In an embodiment, the coating can have a thickness of at least approximately 1.1 μm, at least approximately 5 μm, at least approximately 11 μm, or at least approximately 20 μm. In another embodiment, the coating can have a thickness of not greater than approximately 500 μm, not greater than approximately 300 μm, not greater than approximately 200 μm, or not greater than approximately 150 . In a particular embodiment, the coating has a thickness in a range of approximately 30 μm to approximately 40 μm on a nominal 1 mm diameter optical substrate.

Figure 4:
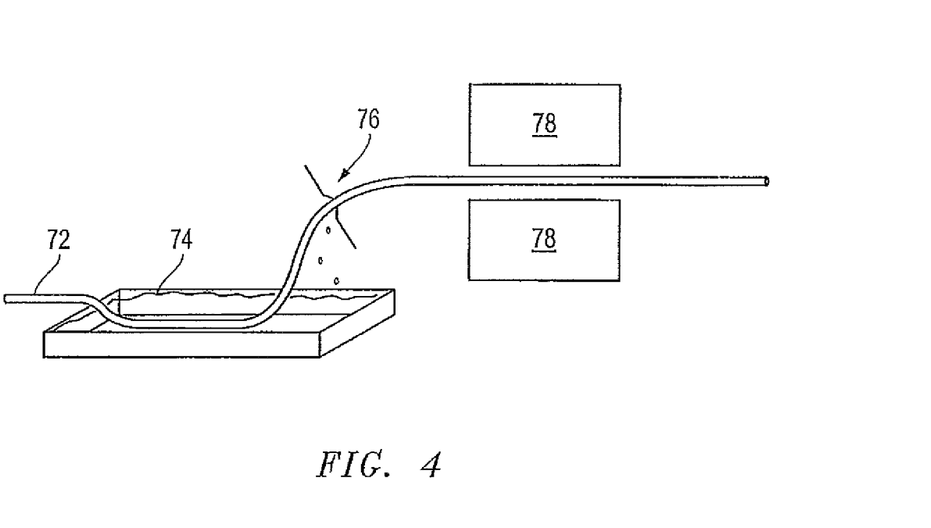
FIG. 4 includes a depiction of an optical fiber being coated.

The optical substrates can be coated by a method used for coating polymer materials onto wires, such as dip coating, spray coating, electrostatic powder coating, or any combination thereof. As illustrated in FIG. 4, an optical substrate 72 can be drawn through and out of a container of coating material 74. Following removal from the container, a doctor blade 76 or other similar tool can be used to remove any excess material. The coated optical substrate may then pass through a heater 78 to dry or set the coating material on the surface of the optical substrate to form a coated optical fiber. The coating material 74 may extend along an entire length of the optical substrate 72 or a portion thereof, for example, only within or extending outside the radiation sensing region when the optical fibers are subsequently assembled within a radiation sensor.

Figure 5:
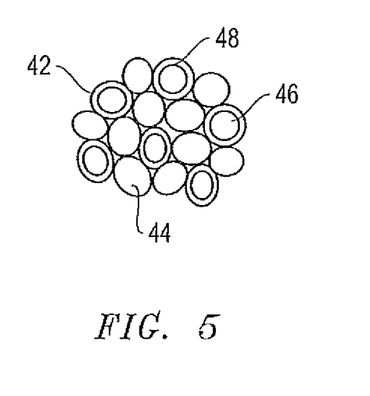
FIG. 5 includes an illustration of a cross-sectional view of a set of optical fibers in accordance with an embodiment.

FIG. 5 includes a cross-sectional view of a portion of the radiation sensor 30. FIG. 5 includes optical fibers, wherein some of the optical fibers are coated optical fibers 42 that include optical substrates 46 surrounded by the coatings 48, and other optical fibers are uncoated optical fibers 44 that include optical substrates 46 without a coating 48. In another embodiment illustrated in FIG. 6, substantially all optical fibers are coated optical fibers 54 with each optical substrate 52 surrounded by a coating 56. Thus, one, some, or substantially all of the optical fibers may be coated optical fibers, and, within at least a radiation sensing region, substantially all of the optical substrates 52 as spaced apart from one another at least in part by the coating 56.

The optical fibers can have a variety of shapes as illustrated in subsequent figures and described herein. The shapes of the optical fibers can depend on the shape of their corresponding optical substrates. From a cross-sectional view, the optical substrates can have polygon shapes. In an embodiment, an optical substrate may have a rectangular shape, a square shape, a triangular shape, a hexagonal shape, or the like. The optical substrates can have rounded shapes. In another embodiment, an optical substrate may have a circular shape, an oval shape, an ellipsoidal shape, or the like. In a further embodiment, a set of optical fibers can include optical substrates having different shapes. For example, the set can include optical substrates having a combination of different polygon shapes or different rounded shapes or a combination of polygon and rounded shapes. Some exemplary shapes are addressed in subsequent figures and their corresponding text.

Figure 6:
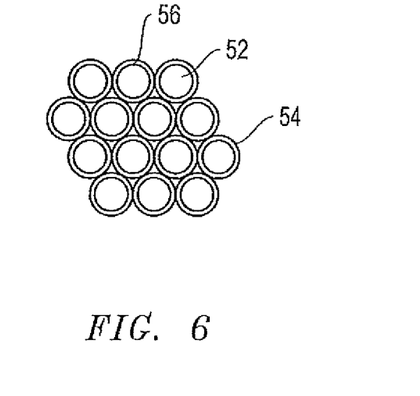
FIG. 6 includes an illustration of a cross-sectional view of another set of optical fibers in accordance with another embodiment.
Figure 7:
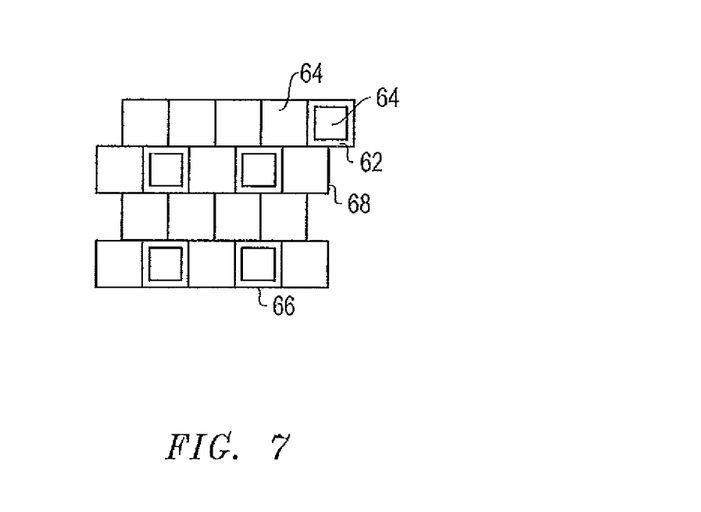
FIG. 7 includes an illustration of a cross-sectional view of a further set of optical fibers in accordance with a further embodiment.

FIGS. 5 and 6 include illustrations of cross-sectional views of optical substrates 46 and 52 having rounded shapes. In the illustrated embodiment, the optical substrates 46 and 52 have a circular shape. FIG. 7 includes an illustration of optical substrates 64 having a polygonal shape. In the illustrated embodiment, the optical substrates 64 have a square shape. FIG. 7 includes an illustration of coated optical fibers 66, including some of the optical substrates 64 and coatings 62, and uncoated optical fibers 68, including other optical substrates 64 that do not have a coating. In another embodiment, substantially all of the optical fibers as illustrated in FIG. 7 can be coated. Other shapes and combinations of shapes are addressed in other figures later in this specification.

Any of the previously described optical fibers can be assembled together, and optical substrates of the optical fibers are optically coupled to the photosensors 26 and 27. Although not illustrated, a window, transparent to the scintillating light or wavelength shifted light, can be disposed between the optical substrates and the photosensors 26 and 27. If needed or desired, an optical coupling agent can be used to aid in optically coupling between the optical substrates and the window. The optical coupling agent can include an epoxy, an acrylate, a silicone, or the like.

From a cross-sectional view, the radiation sensor can have a rounded shape. In an embodiment, the radiation sensor may have a circular shape, an oval shape, an ellipsoidal shape, or the like. From a cross-sectional view, the radiation sensor can have a polygon shape. In an embodiment, the radiation sensor may have a rectangular shape, a square shape, a triangular shape, a hexagonal shape, or the like. Many exemplary shapes are addressed in subsequent figures and their corresponding text.

Figure 8:
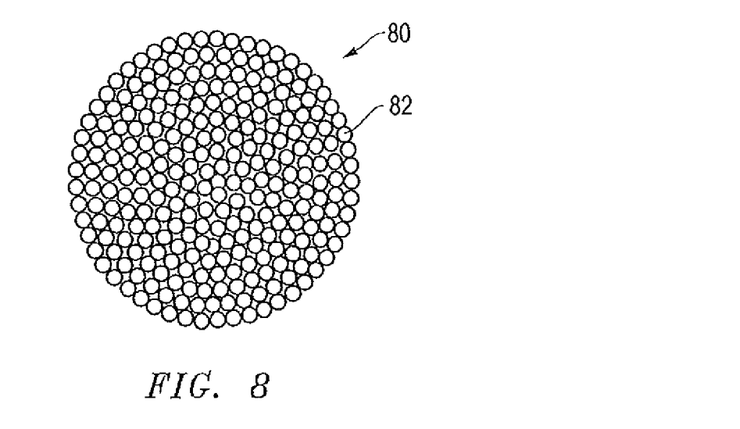
FIGS. 8 through 14 include illustrations of cross-sectional views of different arrangements of optical fibers in accordance with other embodiments.
Figure 9:
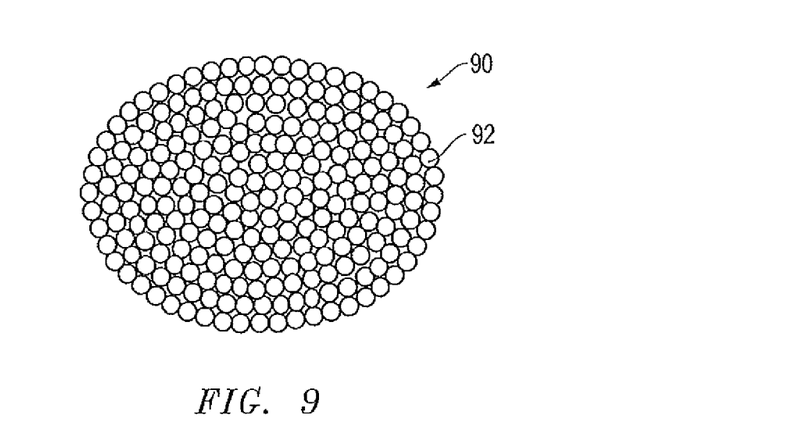
Figure 10:
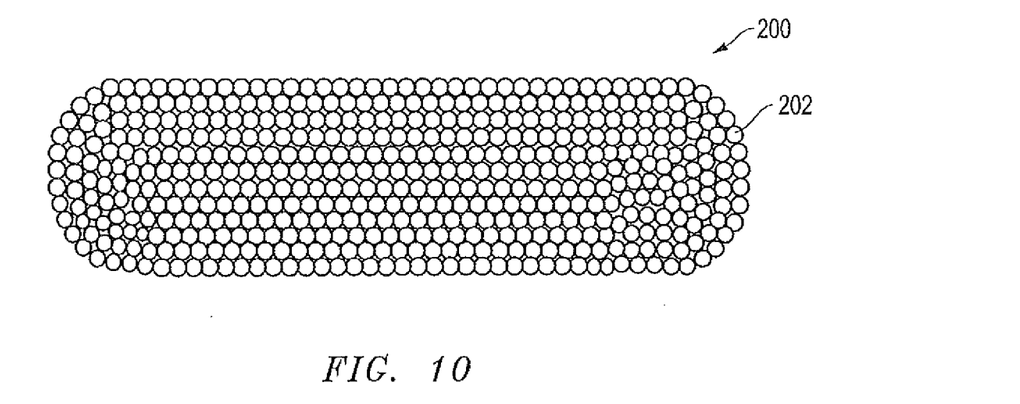

FIGS. 8 to 10 include illustrations of cross-sectional views of portions of radiation sensors within radiation sensing regions, wherein the radiation sensors have rounded shapes. In FIG. 8, a radiation sensor 80 for optical fibers 82 has a circular shape. In another embodiment illustrated in FIG. 9, a radiation sensor 90 for optical fibers 92 has an ellipsoid shape. In a further embodiment illustrated in FIG. 10, a radiation sensor 200 for optical fibers 202 has an oval shape.

Figure 11:
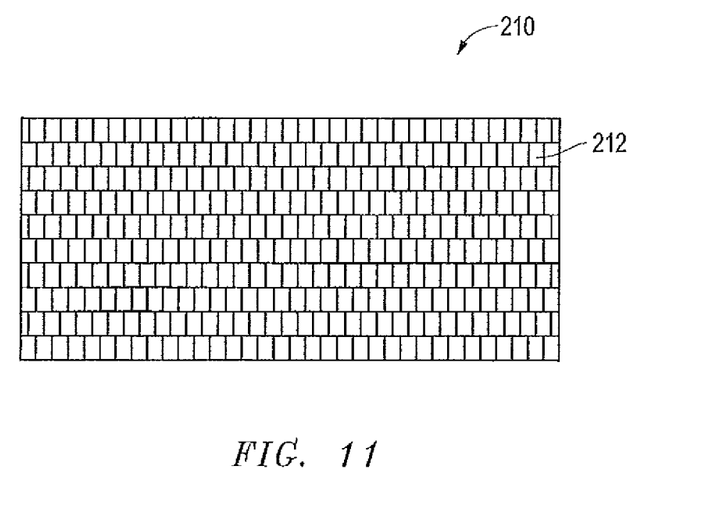

FIGS. 11 to 14 include illustrations of cross-sectional views of portions of radiation sensors within radiation sensing regions, wherein the radiation sensors have polygon shapes. In FIG. 11, a radiation sensor 210 for optical fibers 212 has a rectangular shape. In another embodiment illustrated in FIG. 12, a radiation sensor 220 for optical fibers 222 has a square shape. In a further embodiment illustrated in FIG. 13, a radiation sensor 230 for optical fibers 232 has a triangular shape. In still a further embodiment illustrated in FIG. 14, a radiation sensor 240 for the optical fibers 242 and 244 has a hexagonal shape. The optical fibers 222 used can include a cladding prior to coating.

Figure 12:
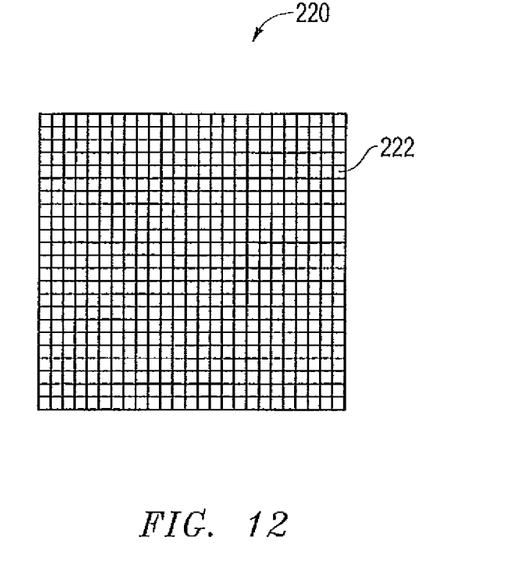
Figure 13:
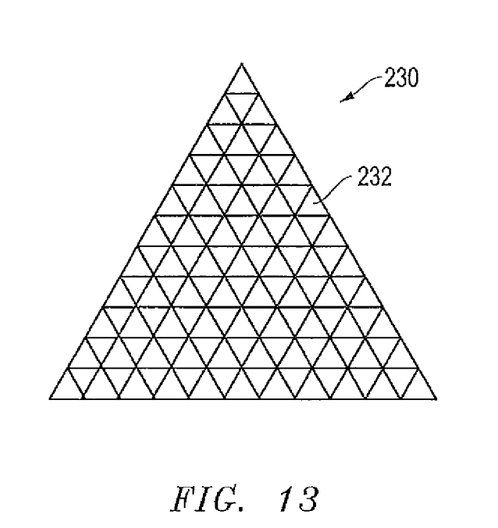
Figure 14:
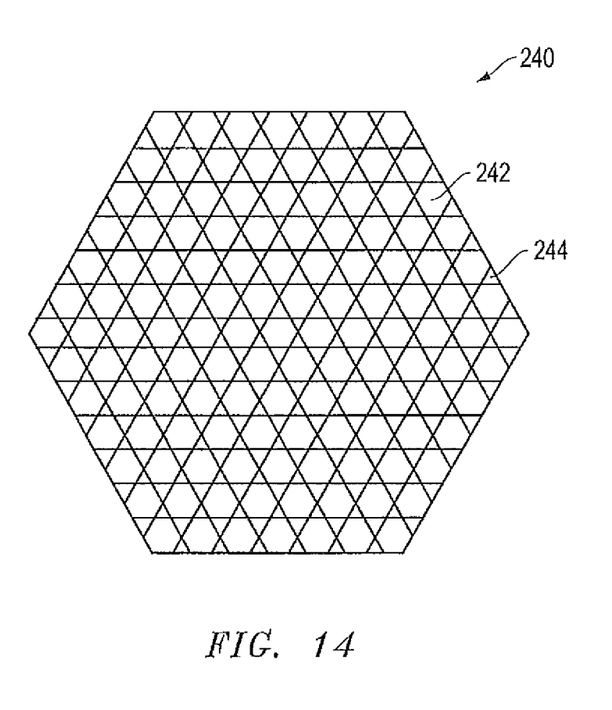

FIGS. 12 to 14 include different shapes of optical fibers and, accordingly, different shapes of optical substrates. Optical substrates of the optical fibers 222 in FIG. 12 can have square shapes, and optical substrates of the optical fibers 232 in FIG. 13 have triangular shapes. A combination of different shapes may also be used. In FIG. 14, optical substrates of the optical fibers 242 have hexagonal shapes, and optical substrates of the optical fibers 244 have triangular shapes. In other embodiments, other combinations of shapes of optical substrates can be used.

Although many shapes have been described with respect to cross-sectional views of the optical substrates and radiation sensing regions, skilled artisans will appreciate that the shapes discussed are merely exemplary. Other shapes can be implemented without departing from the concepts described herein.

For the optical fibers described with respect to FIGS. 8 to 14, at least some of the optical fibers are coated optical fibers. In an embodiment, other optical fibers may be uncoated optical fibers. In another embodiment, substantially all optical fibers are coated optical fibers.

In an embodiment, at least approximately 50%, at least approximately 70%, or at least approximately 90% of the optical fibers in the radiation sensing region do not have a significant bend between the radiation sensing region and a photosensor that is optically coupled to the radiation sensor. In a particular embodiment, substantially all of the optical fibers do not have a significant bend between the radiation sensing region and the photosensor. Accordingly, a radiation detection apparatus using such a radiation sensor may have less light loss due to bends, and therefore, the light intensity reaching the photosensor and signal-to-noise ratio is better for the radiation detection apparatus, as compared to a radiation detection apparatus that includes optical fibers with bends.

The radiation sensor can be fabricated such that its thickness is sufficient as to not require a dedicated neutron moderator surrounding the radiation sensor. Referring to FIG. 1, the neutron moderator 160 is needed to convert fast neutrons to thermal neutrons. Without the neutron moderator 160, at least some fast neutrons would not be converted to thermal neutrons and captured by the phosphorescent material 122, and thus, the neutron count would be detected as being lower than it actually is.

Unlike the radiation sensor 10, the arrangement of the optical fibers as described and illustrated in FIGS. 2 to 14 may obviate the need for a dedicated neutron moderator. The optical substrates of the optical fibers can include a material that is capable of converting a fast neutron to a thermal neutron. The optical fibers can be arranged so that the effective distance through the radiation sensing region is sufficient to allow for conversion and capture of neutrons. The effective distance may be characterized by a width of the radiation sensor within the radiation sensing region. The width can be along a plane perpendicular to an outer surface of the radiation sensor. Within the radiation sensing region and from a cross-sectional view, the radiation sensor can have a width and a length that is greater than the width. For a circular shape, the width is the diameter, and for an oval or ellipsoid, the minor axis corresponds to the width. As measured across the center, the radiation sensor within the radiation sensing region can have a width of at least approximately 0.5 mm, at least approximately 5 mm, at least approximately 11 mm. In another embodiment, the radiation sensor within the radiation sensing region 302 can have a width of no greater than approximately 180 mm, no greater than approximately 130 mm, or no greater than approximately 90 mm.

Figure 15:
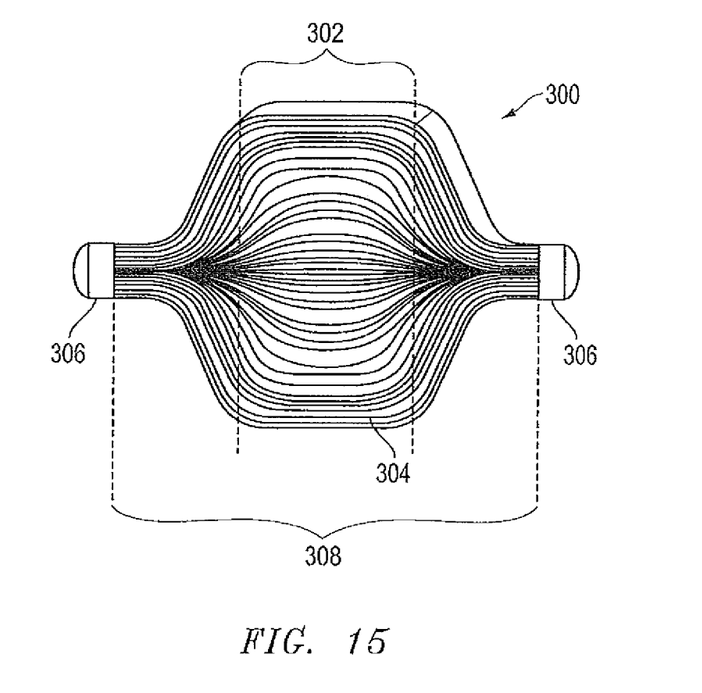
FIG. 15 includes an illustration of a cut-away view of a radiation sensor in accordance with an embodiment.

In another embodiment, a dedicated neutron moderator may be used. FIG. 15 includes a cut-away view of a radiation sensor 300 and photosensors 306. The radiation sensor 300 includes optical fibers 304 that extend between and are optically coupled to the photosensors 306. The optical fibers 304 are organized into a radiation sensing region 302. Between the radiation sensing region 302 and photosensors 306, many of the optical fibers 304 are bent. The radiation sensing region 302 has a width that is significantly smaller than a length 308 of the radiation sensor 300 that generally corresponds to the distance between the photosensors 306. Thus, the radiation sensing region 302 extends over only a fraction of the length 308.

Figure 16:
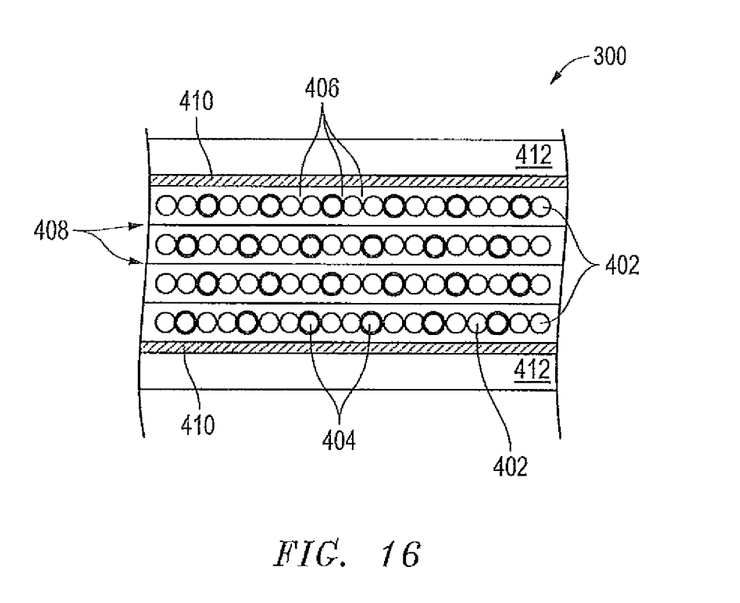
FIG. 16 includes an illustration of a cross-sectional view of a portion of a radiation sensor in accordance with an embodiment.

FIG. 16 includes a cross-sectional view of the radiation detection apparatus that includes the radiation sensor 300. The radiation sensor 300 includes uncoated optical fibers 402 and coated optical fibers 404 in accordance with prior descriptions of such optical fibers. In addition, the radiation sensor 300 may optionally include one or more layers of phosphorescent materials 408 previously described with respect to the coatings of the optical fibers. The coated optical fibers 404 and the layers of phosphorescent materials 408 may include the same phosphorescent material or different phosphorescent materials. More, fewer, or even no layers of phosphorescent material 408 may be used. The space 406 between optical fibers can include a transparent or translucent binder or air or another gas. A reflector 410 can surround the optical fibers, and an optional neutron moderator 412 can surround the reflector 410. Thus, coated optical fibers may be used to modify existing designs of radiation sensors. In an embodiment, the coating of the coated optical fibers 404 may or may not be coated only within radiation sensing region 302.

A radiation sensor formed in accordance with the concepts herein and has a relatively long radiation sensing region. In an embodiment, the radiation sensing region can be at least approximately 0.5 meters, at least approximately 1 meters, at least approximately 2 meter meters in a particular direction, such as length. The detector design as described herein is also scalable and can be used as a replacement for or in conjunction with $^3$He tubes that are approximately 20 mm in diameter and approximately 130 mm long.

Figure 17:
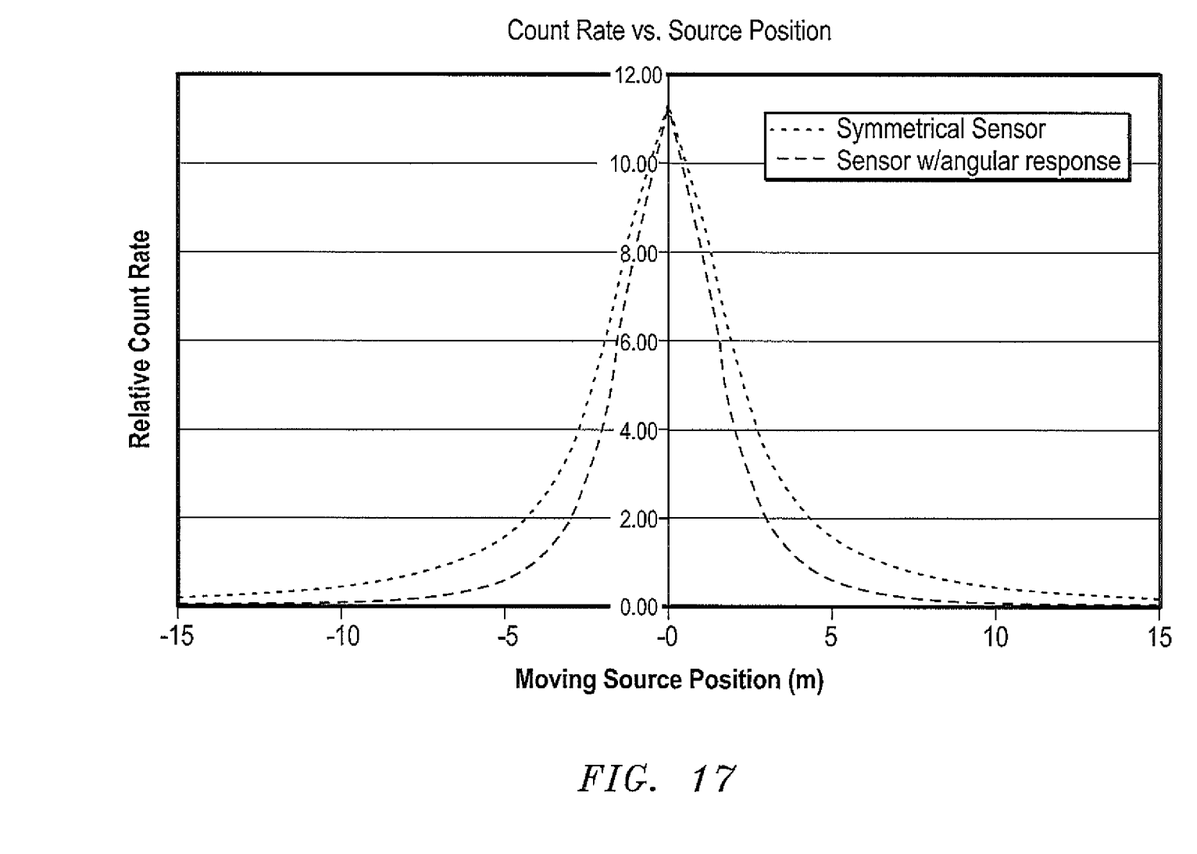
FIG. 17 includes an illustration of the sensitivity for different types of detectors as a function of distance from the center of the detector.

A radiation sensor can have responses that may or may not have an angular dependence. For example, the response for a cylindrical radiation sensor will not have an angular dependence due to a round shape about a central axis. Unlike the cylindrical radiation sensor, a flat radiation sensor, such as the radiation sensor 300 as illustrated in FIG. 15, has an angular dependence. FIG. 17 is a plot of a relative count rate as a function of the position of a moving radiation source for a symmetrical radiation sensor and another radiation sensor having angular dependence. For a cylindrical radiation sensor, the radiation source moves along a tangent to the outer surface. For a flat radiation sensor, the radiation source moves parallel to the flat surface. The motion is similar to the motion of an object, such as a human or a truck, that passes by a radiation detector that is used at a port of entry.

When comparing the cylindrical radiation sensor to the flat radiation sensor, the cylindrical radiation sensor has significantly higher relative counts as a radiation source approaches and moves away from the center of the radiation sensor. Thus, the cylindrical radiation sensor will sense a radiation source before the flat radiation sensor senses the radiation source, and the cylindrical radiation sensor will sense a radiation source for a longer time as compared to the flat radiation sensor. When a radiation source is more than 1 meter away from the center of the radiation sensor, the cylindrical radiation sensor will have a count rate of about 50% higher than the flat radiation sensor.

Figure 18:
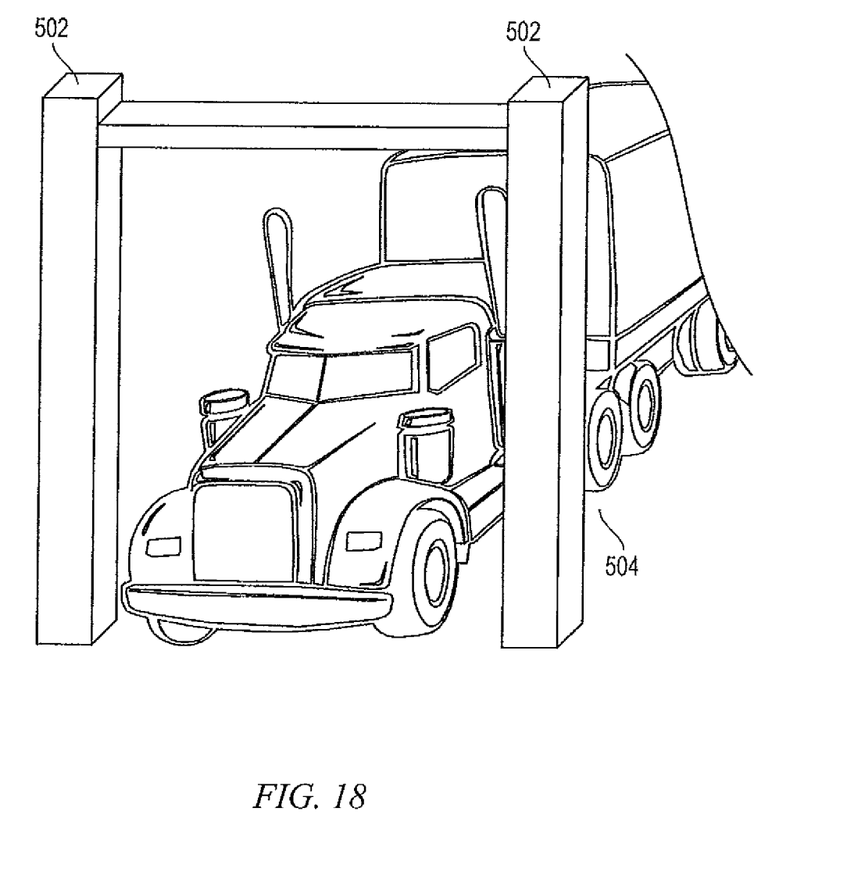
FIG. 18 includes an illustration of a perspective view of a radiation detection apparatus and an object near the radiation detection apparatus.

The radiation detection apparatus can be a medical imaging apparatus, a well logging apparatus, a security inspection apparatus, or the like. As illustrated in FIG. 18, the radiation detection apparatus 502 can be used as a security inspection apparatus. The radiation detection apparatus 502 can include one or more radiation sensors and photosensor arrangements (not separately illustrated in FIG. 18) as described herein. The radiation sensor(s) can be of any of the previously described radiation sensors. As illustrated in FIG. 17, the radiation sensor(s) may be located within either or both of the vertical columns, the horizontal cross member, or any combination thereof.

When in use, an object 504 can be placed near or pass through an opening within radiation detection apparatus 502. As illustrated in the embodiment of FIG. 18, the object 504 is a vehicle, and in particular, a truck. The radiation detection apparatus 502 can capture at least part of the targeted radiation emitted by the object 504. The radiation sensors can emit scintillating light or wavelength shifted light that is converted to an electronic signal by the photosensors. The electronic signal can be transmitted to a control module (not illustrated) for further analysis.

Embodiments described herein can allow for the placement of phosphorescent materials within coatings that are significantly closer to optical substrates, through which scintillating light is transmitted or shifted to a different wavelength. The closer location between the phosphorescent material and the optical substrates can allow a stronger intensity of light to be received by the photosensors and, accordingly, may increase the signal-to-noise ratio for the radiation detection apparatus. Further, when only some of the optical fibers are coated, the total amount of phosphorescent material within the radiation detector may be less than in a conventional radiation detection apparatus that includes layers of phosphorescent material.

Other embodiments do not require a dedicated neutron moderator to surround an arrangement of optical fibers. The optical fibers can include optical substrates that include a material that is capable of converting fast neutrons to thermal neutrons. When the optical fibers are arranged to an appropriate thickness, fast neutrons can be converted to thermal neutrons and captured by the phosphorescent material. During manufacturing, an operation to place a neutron moderator around the optical fibers is not needed, thus, saving production time and potential yield losses or other defects associated with performing operations that are not required.

Many different aspects and embodiments are possible. Some of those aspects and embodiments are described herein. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

In a first aspect, a radiation sensor has a sensing region, and the radiation sensor can include optical fibers comprising optical substrates including a particular optical substrate, wherein a coating is adjacent to the particular optical substrate. The coating can include a phosphorescent material. From a cross-sectional view, the coating can substantially completely surround a perimeter of the particular optical substrate.

In an embodiment of the first aspect, each coating substantially completely surrounds a perimeter of each optical substrate within at least some individual optical substrates.

In a second aspect, a radiation sensor can include optical fibers comprising optical substrates, wherein coatings are adjacent to at least some individual optical substrates. Each of the coatings can include a phosphorescent material. The optical fibers may be arranged in an irregular pattern.

In a third aspect, a radiation sensor can include optical fibers comprising optical substrates, wherein coatings are adjacent to at least some individual optical substrates. Each of the coatings can include a phosphorescent material. Within a sensing region of the radiation sensor, the optical fibers can be arranged such that a majority of the optical fibers contact at least three other optical fibers.

In a particular embodiment of any of the foregoing aspects and embodiments, the coating includes a substantially transparent or translucent binder. In a more particular embodiment, the binder includes an epoxy or an acrylate. In another particular embodiment of any of the foregoing aspects and embodiments, the optical fibers are arranged in an irregular pattern. In another particular embodiment of any of the foregoing aspects and embodiments, the optical fibers are arranged in a form of a closely packed bundle. In another particular embodiment of any of the foregoing aspects and embodiments, the targeted radiation is neutrons. In a more particular embodiment when the targeted radiation is neutrons, a dedicated neutron moderator does not surround the optical fibers, or if present, the dedicated neutron moderator surrounds the optical fibers. More particularly, the optical substrates are capable of converting a fast neutron into a thermal neutron.

In a further particular embodiment of any of the foregoing aspects and embodiments, the coating has a thickness of at least approximately 1.1 µm, at least approximately 5 µm, at least approximately 11 µm, or at least approximately 20 µm, and in another further particular embodiment, the coating has a thickness of not greater than approximately 500 µm, not greater than approximately 300 µm, not greater than approximately 200 µm, or not greater than approximately 150 µm. In another particular embodiment of any of the foregoing aspects and embodiments, within the radiation sensing region, the radiation sensor has a width of at least approximately 0.5 mm, at least approximately 5 mm, at least approximately 11 mm, and in still another particular embodiment, within the radiation sensing region, the radiation sensor has a width no greater than approximately 180 mm, no greater than approximately 130 mm, or no greater than approximately 90 mm. In an example of the first embodiment, the sensing region has a width of at least approximately 20 mm, at least approximately 30 mm, or at least approximately 40 mm.

In still another particular embodiment of any of the foregoing aspects and embodiments, from a cross-sectional view within the radiation sensing region, the radiation sensor has a polygon shape, such as a substantially rectangular shape, a substantially square shape, or another polygon shape. In yet another particular embodiment of any of the foregoing aspects and embodiments, from a cross-sectional view within the radiation sensing region, the radiation sensor has a rounded shape, such as a substantially circular shape, a substantially oval shape, a substantially ellipsoidal shape, or another rounded shape.

In a particular embodiment of any of the foregoing aspects and embodiments, the optical substrates include a polymer material. In a more particular embodiment, the polymer material includes a polyacrylate, a polystyrene, or a polyvinyltoluene. In a still more particular embodiment, the polymer material includes a polymethylmethacrylate.

In a particular embodiment of any of the foregoing aspects and embodiments, the optical substrates include a wavelength shifting material. In a more particular embodiment, the optical substrates are capable of shifting the wavelength of the scintillating light to blue light or to green light.

In still another particular embodiment of any of the foregoing aspects and embodiments, from a cross-sectional view, the optical substrates have polygon shapes, such as substantially rectangular shapes, substantially square shapes, or other polygon shapes. In yet another particular embodiment of any of the foregoing aspects and embodiments, from a cross-sectional view, the optical substrates have rounded shapes, such as substantially circular shapes, substantially oval shapes, substantially ellipsoidal shapes, or other rounded shapes. In a more particular embodiment, any two particular optical substrates can have different polygon or rounded shapes.

In another particular embodiment of any of the foregoing aspects and embodiments, the phosphorescent material includes a first material and a second material. The first material is capable of generating a secondary particle in response to capturing a targeted radiation, and the second material is capable of generating scintillating light in response to exposure to the secondary particle. In a further particular embodiment of any of the foregoing aspects and embodiments, the first material of the coating includes $^6$Li or $^{10}$B. In a particular embodiment, the first material includes $^6$LiF. In another further particular embodiment of any of the foregoing aspects and embodiments, the second material includes a ZnS, a $CdWO_4$, a $Y_2SiO_5$, a ZnO, a ZnCdS, or any combination thereof. In a more particular embodiment, the second material includes ZnS:Ag, ZnS:Cu, ZnS:Ti, $Y_2SiO_5$:Ce, ZnO:Ga, ZnCdS:Cu, or any combination thereof.

In yet a further particular embodiment of any of the foregoing aspects and embodiments, the radiation sensor has a radiation sensing region of at least approximately 1.1 meters, at least approximately 2 meters, at least approximately 4 meters, or at least approximately 8 meters in a particular direction. In another particular embodiment of any of the foregoing aspects and embodiments, the radiation sensor has a main body that is substantially cylindrical. In a further particular embodiment of any of the foregoing aspects and embodiments, a photosensor is optically coupled to the optical substrates of the radiation sensor. In a more particular embodiment, at least approximately 50%, at least approximately 70%, or at least approximately 90% of the optical fibers do not have a significant bend between the radiation sensing region and the photosensor. In still another particular embodiment of any of the foregoing aspects and embodiments, the optical substrates are spaced apart from one another within a radiation sensing region. In a further particular embodiment of any of the foregoing aspects and embodiments, the targeted radiation is gamma radiation.

In a particular aspect, a method of using a radiation detection apparatus can include providing the radiation detection apparatus that includes a radiation sensor of any one of any of the foregoing aspects and embodiments, wherein the radiation sensor has a radiation sensing region. The method can also include placing an object near the radiation sensing region, capturing at the first material at least part of a targeted radiation emitted by the object, generating a secondary particle at the first material in response to capturing at least part of the targeted radiation, and generating scintillating light at the second material in response to exposure of the second material to the secondary particle. The method can further include transmitting the scintillating light or a derivative thereof along at least one optical substrate of the optical substrates. In a more particular embodiment, the method can further include converting a fast neutron into a thermal neutron, wherein converting is performed by optical substrates within the optical fibers. In another more particular embodiment, the method can include shifting a wavelength of the scintillating light to the derivative light having a different wavelength, wherein shifting is performed by the optical substrates. In an even more particular embodiment, the derivative light comprises blue light or green light.

In a fourth aspect, a method of making an optical fiber can include providing optical substrates and forming a coating on at least some optical substrates. The coating can include a phosphorescent material.

In an embodiment of the fourth aspect, forming the coating includes dip coating, spray coating, electrostatic powder coating, or any combination thereof. In another embodiment, excess coating material is removed from the surface of the optical substrates. In a further embodiment, the optical substrates are heated to form a set coating. In still a further embodiment, the coating has a thickness of at least approximately 1.1 µm, at least approximately 5 µm, at least approximately 11 µm, or at least approximately 20 µm. In yet a further embodiment, the coating has a thickness no greater than approximately 500 µm, no greater than approximately 300 µm no greater than approximately 200 µm, or no greater than approximately 150 µm.

In another embodiment of the fourth aspect, the phosphorescent material includes a first material and a second material, the first material is capable of generating a secondary particle in response to capturing a targeted radiation, and the second material is capable of generating scintillating light in response to exposure to the secondary particle. In a particular embodiment, the first material comprises $^6$Li, $^{10}$B, or, in particular, $^6$LiF. In another particular embodiment, the second material includes a ZnS, a CdWO$_4$, a Y$_2$SiO$_5$, a ZnO, a ZnCdS, or any combination thereof.

In a fifth aspect, an optical fiber can include an optical substrate and a coating that includes a phosphorescent material, wherein, from a cross-sectional view, the coating surrounds a perimeter of the optical substrate.

In an embodiment of the fifth aspect, the coating has a thickness of at least approximately 1.1 µm, at least approximately 5 µm, at least approximately 11 µm, or at least approximately 20 µm. In another embodiment, the coating has a thickness no greater than approximately 500 µm, no greater than approximately 300 µm no greater than approximately 200 µm, or no greater than approximately 150 µm. In a further embodiment, the phosphorescent material includes a first material and a second material, wherein the first material is capable of generating a secondary particle in response to capturing a targeted radiation, and the second material is capable of generating scintillating light in response to exposure to the secondary particle. In a particular embodiment, the first material includes $^6$Li or $^{10}$B. In another particular embodiment, the second material includes a ZnS, a CdWO$_4$, a Y$_2$SiO$_5$, a ZnO, a ZnCdS, or any combination thereof. In a further embodiment, the coating further includes an organic binder.

Note that not all of the activities described above in the general description or the examples are required, that a portion of a specific activity may not be required, and that one or more further activities may be performed in addition to those described. Still further, the order in which activities are listed is not necessarily the order in which they are performed.

Certain features that are, for clarity, described herein in the context of separate embodiments, may also be provided in combination in a single embodiment. Conversely, various features that are, for brevity, described in the context of a single embodiment, may also be provided separately or in any subcombination. Further, reference to values stated in ranges includes each and every value within that range.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A radiation sensor having a radiation sensing region, wherein the radiation sensor comprises:
    optical fibers comprising optical substrates including a particular optical substrate,
    wherein:
    a coating is adjacent to the particular optical substrate;
    the coating includes a phosphorescent material that includes a neutron sensitive material,
        wherein the phosphorescent material includes a first material and a second material;
        the first material includes $^6$Li or $^{10}$B; and
        the second material includes a ZnS, a CdWO$_4$, a Y$_2$SiO$_5$, a ZnO, a ZnCdS, or any combination thereof; and
    from a cross-sectional view, the coating substantially completely surrounds a perimeter of the particular optical substrate,
    wherein the radiation sensor does not include a dedicated neutron moderator surrounding radiation sensor.

2. The radiation sensor of claim 1, wherein from a cross-sectional view, each coating substantially completely surrounds a perimeter of each optical substrate within at least some individual optical substrates.

3. The radiation sensor of claim 1, wherein the coating has a thickness in a range of 5 µm to 300 µm.

4. The radiation sensor of claim 1, wherein the optical substrates are capable of converting a fast neutron into a thermal neutron.

5. The radiation sensor of claim 1, wherein each of the optical substrates comprises an optical core and a cladding, wherein the cladding includes a polyacrylate, and the optical core includes a polymer that is different from the polyacrylate.

6. The radiation sensor of claim 1, wherein the optical substrates include a wavelength shifting material.

7. A radiation sensor having a radiation sensing region, wherein the radiation sensor comprises:
    optical fibers comprising optical substrates, wherein:
    coatings are adjacent to at least some individual optical substrates;
    each of the coatings includes a phosphorescent material and is an exterior surface of the optical fiber;
        wherein the phosphorescent material includes a first material and a second material;
        the first material includes $^6$Li or $^{10}$B; and
        the second material includes a ZnS, a CdWO$_4$, a Y$_2$SiO$_5$ a ZnO, a ZnCdS or any combination thereof; and
    within the radiation sensing region of the radiation sensor, the optical fibers are arranged such that a majority of the optical fibers contact at least three other optical fibers.

8. The radiation sensor of claim 7, wherein:
    the optical fibers are arranged in an irregular pattern.

9. The radiation sensor of claim 7, wherein within the radiation sensing region, the radiation sensor has a width in a range of 5 mm to 180 mm.

10. The radiation sensor of claim 7, wherein from a cross-sectional shape within the radiation sensing region, the radiation sensor has a rounded shape.

11. The radiation sensor of claim 7, wherein the optical substrates include a wavelength shifting material.

12. The radiation sensor of claim 7, wherein the coating has a thickness in a range of 5 μm to 300 μm.

13. The radiation sensor of claim 7, wherein the radiation sensor has a main body that is substantially cylindrical.

* * * * *